(12) United States Patent
Takaba

(10) Patent No.: US 7,426,600 B2
(45) Date of Patent: Sep. 16, 2008

(54) BUS SWITCH CIRCUIT AND BUS SWITCH SYSTEM

(75) Inventor: Nobuhide Takaba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 135 days.

(21) Appl. No.: 11/024,717

(22) Filed: Dec. 30, 2004

(65) Prior Publication Data
US 2006/0031614 A1 Feb. 9, 2006

(30) Foreign Application Priority Data
Aug. 6, 2004 (JP) ............................... 2004-231398

(51) Int. Cl.
*G06F 13/00* (2006.01)
(52) U.S. Cl. .................. 710/316; 710/317; 710/110; 710/244
(58) Field of Classification Search ................ 710/110, 710/113, 114, 116, 121, 316, 317, 264, 266, 710/268, 269
See application file for complete search history.

(56) References Cited

U.S. PATENT DOCUMENTS

| | | | | |
|---|---|---|---|---|
| 5,761,455 A | * | 6/1998 | King et al. ................... | 710/316 |
| 5,862,359 A | * | 1/1999 | Nozuyama ................... | 710/316 |
| 6,295,573 B1 | * | 9/2001 | Bailey et al. ................. | 710/260 |
| 6,587,905 B1 | | 7/2003 | Correale, Jr. et al. | |
| 6,662,260 B1 | * | 12/2003 | Wertheim et al. ............ | 710/316 |
| 6,857,035 B1 | * | 2/2005 | Pritchard et al. ............. | 710/110 |
| 6,954,810 B2 | * | 10/2005 | Delaney ...................... | 710/107 |
| 7,032,061 B2 | * | 4/2006 | Huch et al. .................. | 710/316 |
| 7,069,376 B2 | * | 6/2006 | Mathewson et al. .......... | 710/316 |
| 7,076,595 B1 | * | 7/2006 | Dao et al. .................... | 710/317 |
| 7,136,956 B2 | * | 11/2006 | Furuya et al. ................ | 710/316 |

* cited by examiner

*Primary Examiner*—Khanh Dang
(74) *Attorney, Agent, or Firm*—Arent Fox LLP

(57) ABSTRACT

A bus switch circuit having plural master side interface circuits inputting/outputting signals for plural bus masters respectively, and one or plural slave side interface circuit(s) inputting/outputting signals for one or plural bus slave(s), is provided. The master side interface circuit and the slave side interface circuit input an interrupt signal inputted at least to one bus master, and establish a signal path between the plural bus masters and the one or plural bus slave(s) in accordance with the interrupt signal.

21 Claims, 12 Drawing Sheets

F I G. 1
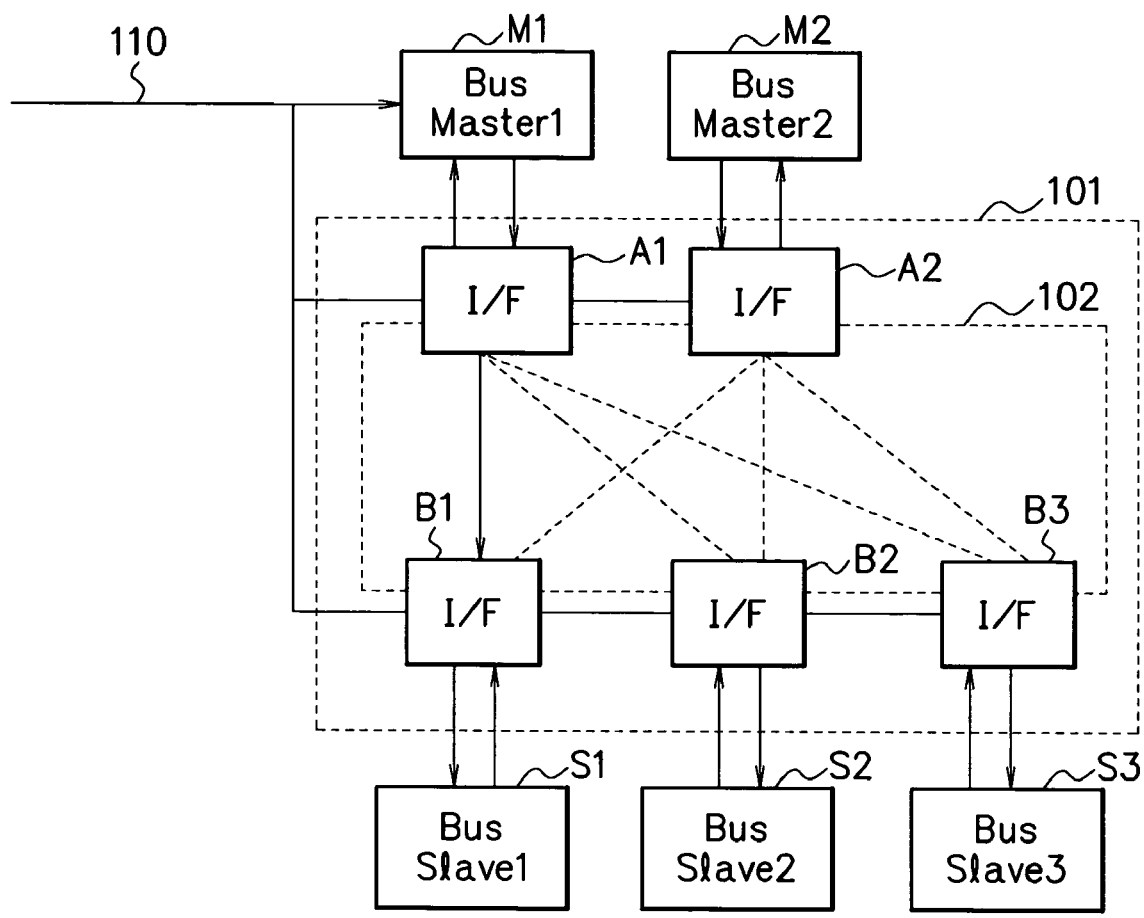

F I G. 7
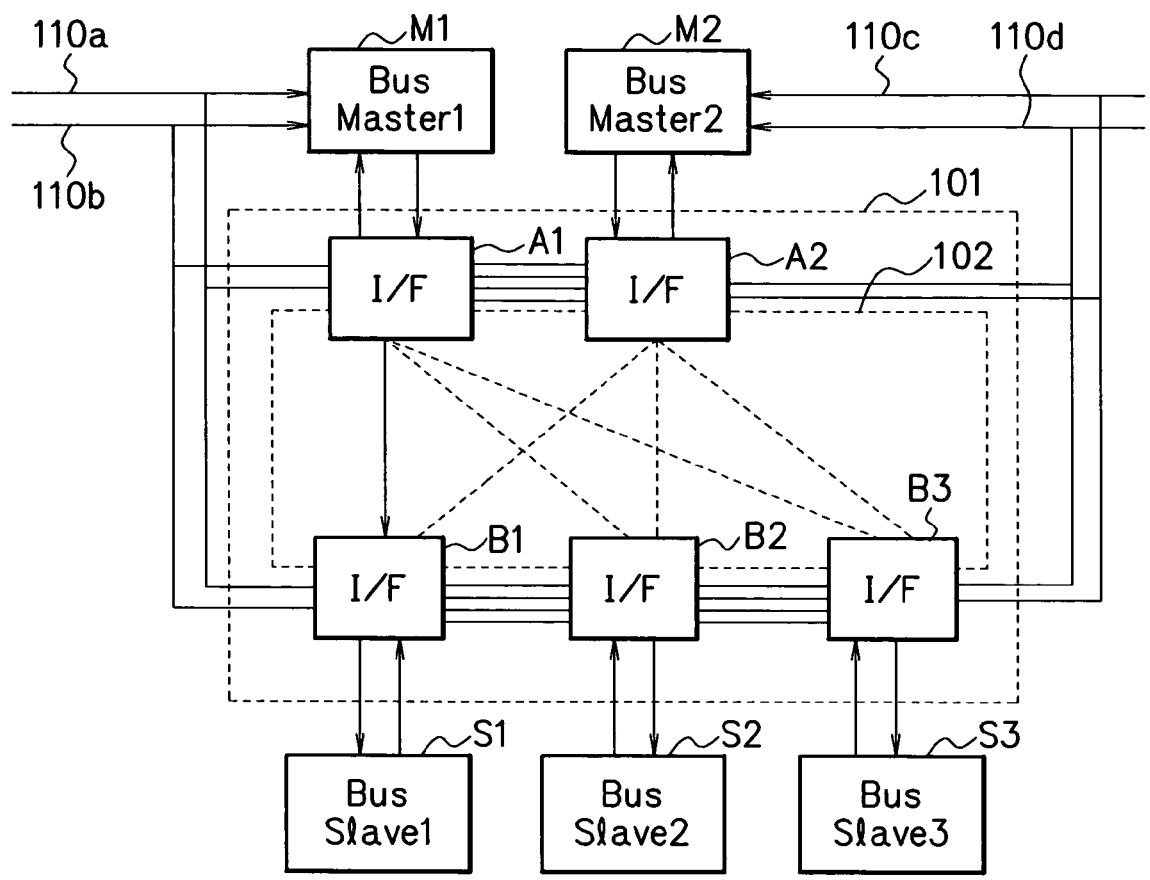

F I G. 10
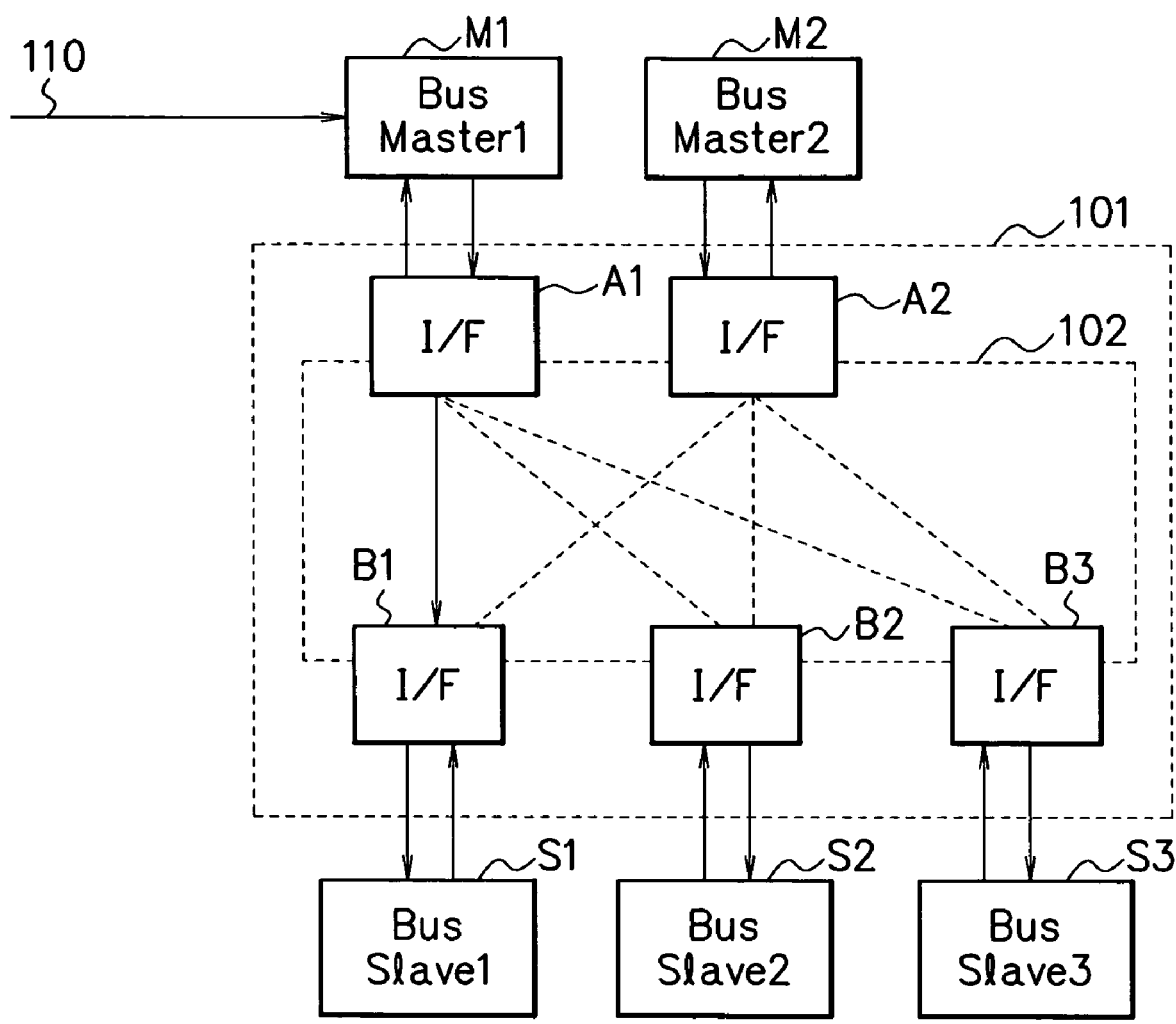

US 7,426,600 B2

BUS SWITCH CIRCUIT AND BUS SWITCH SYSTEM

CROSS-REFERENCE TO RELATED APPLICATIONS

This application is based upon and claims the benefit of priority from the prior Japanese Patent Application No. 2004-231398, filed on Aug. 6, 2004, the entire contents of which are incorporated herein by reference.

BACKGROUND OF THE INVENTION

1. Field of the Invention

The present invention relates to a bus switch, especially to a bus switch for establishing a signal path between a bus master and a bus slave.

2. Description of the Related Art

Recently, it becomes possible to integrate several hundreds K gates scale of many function blocks such as CPU, DSP, MPEG-CODEC, in one LSI owing to a progress of a technology. Besides, examples are increasing that a multilayered bus switch is used to perform data communications between these function blocks smoothly, and to increase transmission efficiency thereof. Also in a built-in LSI system, a multi-structured bus specification such as AXI or OCP recommended by ARM company are appearing.

In FIG. 10 of the following Patent Document 1, there is disclosed a bus switch to connect plural masters with plural slaves.

[Patent Document 1] U.S. Pat. No. 6,587,905

SUMMARY OF THE INVENTION

An object of the present invention is to provide a bus switch which can establish a signal path between a bus master and a bus slave with a proper priority when the bus master has access to the bus slave in accordance with an interrupt signal.

According to an aspect of the present invention, a bus switch circuit having plural master side interface circuits inputting/outputting signals for plural bus masters respectively, and one or plural slave side interface circuit(s) inputting/outputting signals for one or plural bus slave(s) is provided. The master side interface circuit and the slave side interface circuit input an interrupt signal inputted to at least one bus master, and establish the signal path between the plural bus masters and the one or plural bus slave(s) according to the interrupt signal.

BRIEF DESCRIPTION OF THE DRAWINGS

FIG. 1 is a block diagram showing a structure example of a bus switch system according to a first embodiment of the present invention;

FIG. 7 is a block diagram showing a structure example of a bus switch system according to a third embodiment of the present invention;

FIG. 10 is a block diagram showing a structure of a bus switch system;

DETAILED DESCRIPTION OF THE PREFERRED EMBODIMENTS

FIG. 10 is a block diagram showing a structure of a bus switch system. A bus switch system has plural bus masters M1, M2, plural bus slaves S1, S2, S3, and a bus switch circuit 101. The case when the bus switch system has the two bus masters M1, M2 and the three bus slaves S1 to S3 is explained as an example. The bus masters M1, M2 are, for example, CPU, DSP, MPEG decoder, or the like. The bus slaves S1 to S3 are, for example, SDRAM, flash memory, UART, USB, or the like.

The bus masters M1, M2 are master modules which actively access to the respective bus slaves S1, S2, S3 via the bus switch circuit 101. The bus slaves S1, S2, S3 are slave modules which perform various functions (memory access, serial communication, and so on) in accordance with access requests from the bus masters M1, M2. The bus switch circuit 101 adjusts signal flows between the bus masters M1, M2, and the bus slaves S1 to S3.

The bus switch circuit 101 has master side interface circuits A1, A2, slave side interface circuits B1, B2, B3, and a switch matrix 102. The master side interface circuits A1, A2 have decoders and have interface functions with the bus masters M1, M2. The decoder decodes addresses supplied from the bus masters M1, M2, and selects the bus slaves S1 to S3 to be connected.

At the switch matrix 102, a signal path between the master side interface circuits A1, A2, and the slave side interface circuits B1 to B3 is connected, and thereby access information from the master side interface circuits A1, A2 is sent to the slave side interface circuits B1 to B3.

The slave side interface circuits B1 to B3 have bus arbitration circuits (arbiter), and have the interface functions with the bus slaves S1 to S3. The bus arbitration circuit adjusts the access requests from the respective master side interface circuits A1, A2, and when the requests occur at the same time, an access permission is given to the request having a predetermined higher priority. Specifically, the slave side interface circuits B1 to B3 adjust path establishment requests from the master side interface circuits A1, A2, issue a wait (wait for permission) signal to the master side interface circuit A1 or A2 other than the object of the path establishment, and issue a connection permission to the master side interface circuit A1 or A2 which is the object of the path establishment.

Figure 11:
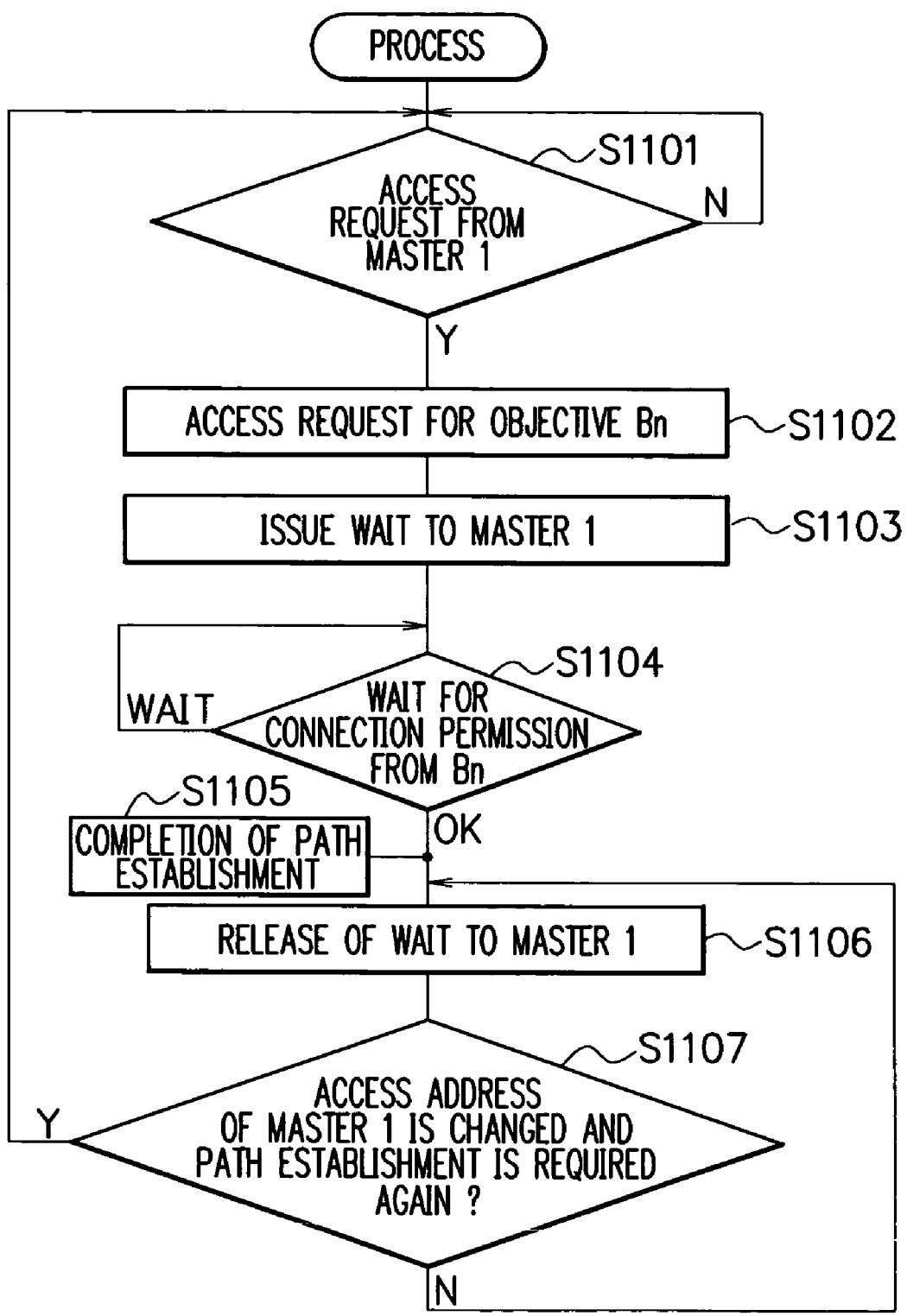
FIG. 11 is a flow chart showing a process of a master side interface circuit.

FIG. 11 is a flow chart showing a process of the master side interface circuit A1. The process of the master side interface circuit A2 is the same as this process. At the step S1101, the master side interface circuit A1 waits until an access request arises from the bus master M1. If the access request arises, at the step S1102, the access request is sent to a slave side interface circuit Bn which is a target of the access. Here, the slave side interface circuit Bn is any of the interface circuits B1 to B3 specified by an address. Next, at the step S1103, a wait signal is issued and sent to the bus master M1. Next, at the step S1104, the master side interface circuit A1 waits for the connection permission from the slave side interface circuit Bn. If the connection permission is obtained, at the step S1105, the path establishment between the master side interface circuit A1 and the slave side interface circuit Bn is completed. Next, at the step S1106, a wait releasing signal is sent to the bus master M. Next, at the step S1107, an access address of the bus master M1 is changed, and it is checked if the path establishment is required again or not. If it is required, the process goes back to the step S1101, and if it is not required it goes back to the step S1106.

Figure 12:
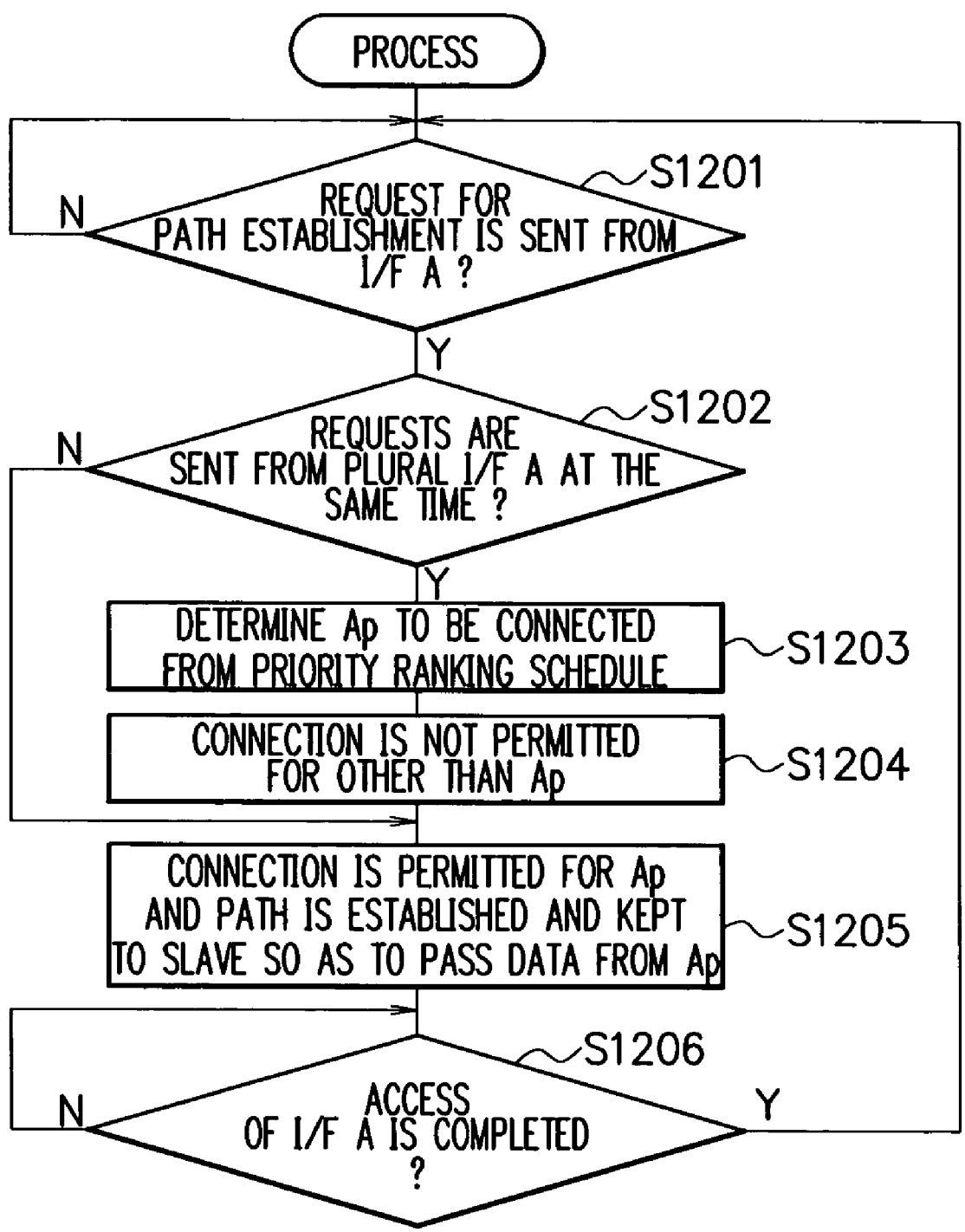
FIG. 12 is a flow chart showing a process of a slave side interface circuit.

FIG. 12 is a flow chart showing a process of the slave side interface circuit B1. The processes) of the slave side interface circuits B2, B3 are the same as this process. At the step S1201, the slave side interface circuit B1 waits until a path establishment request is sent from the master side interface circuits A1, A2. If the request is sent, at the step S1202, it is checked if the requests are sent from the plural master side interface circuits A1, A2 at the same time, or not. If the requests are sent at the same time, the process goes to the step S1203, and if it is not sent, the process goes to the step S1205. At the step S1203, a master side interface circuit Ap to be connected is determined by a priority ranking schedule. The master side interface circuit Ap is the master side interface circuit which has a higher priority ranking among the bus masters M1 and M2, and either of the master side interface circuit A1 or A2. Next, at the step S1204, it is notified to the master side interface circuit other than the master side interface circuit Ap that the connection is not permitted. Next, at the step S1205, the connection permission is notified to the master side interface circuit Ap, and a path is established and kept to the corresponding bus slaves S1 to S3 so as to pass data from the master side interface circuit Ap. Next, at the step S1206, the slave side interface circuit B1 waits until the accesses of the master side interface circuits A1, A2 are completed. After they are completed, the process goes back to the step S1201.

For example, the case when the bus master M2 has a higher priority than the bus master M1 is explained. While the bus master M1 accesses to the bus slave S3, it is assumed that the bus master M2 sends an access request to the bus slave S3. In this case, the interface circuit B3 performs a bus arbitration, cuts off the path to the interface circuit A1, and determines the path establishment with the interface circuit A2. The interface circuit A1 sends a wait signal to the bus master M1. The bus master M1 suspends the process. After the access between the bus master M2 and the bus slave S3 is completed, the interface circuit A1 sends a wait releasing signal to the bus master M1. The bus master M1 restarts the suspended access.

Next, an interrupt signal 110 is explained. The interrupt signal 110 is a top priority signal inputted to the bus master M1 from externals, and it has a higher priority than the bus masters M1 and M2. When the interrupt signal 110 is inputted, the bus master M1 suspends the process up to that time, and performs an access process according to the interrupt signal 110. For example, the interrupt signal 110 is inputted while the bus master M1 is having access to the bus slave S3, the access to the bus slave S3 is suspended, and the access to the bus slave S1 is started. After the access based on the interrupt signal 110 is completed, the suspended access to the bus slave S3 is restarted.

Next, the case when the interrupt signal 110 is inputted to the bus master M1 while the bus master M2 is making access to the bus slave S1 is explained. In this case, the interrupt signal 110 has a higher priority than the bus master M2, and therefore, essentially, the interface circuit B1 should suspend the process with the bus master M2, and give priority to the access of the bus master M1 according to the interrupt signal 110. However, the interface circuit B1 judges that the access request comes from the bus master M1 even if it is the access request according to the interrupt signal 110. In that case, the bus master M1 has a lower priority than the bus master M2, and therefore the process of the bus master M2 comes before. As a result, the process of the bus master M1 according to the interrupt signal 110 is to be waited.

As stated above, the bus switch circuit 101 adjusts the access requests from the plural bus masters M1, M2, and realizes a high throughput by establishing a signal transmission path between the bus masters M1, M2, and the bus slaves S1 to S3. However, in an LSI being a bus switch system, a high-speed real-time response performance is required for plural requests from the external of the LSI, and therefore, the interrupt signals 110 are in heavy use.

Besides, demands for portable devices are increasing in recent years, and thereby an operating life of the portable devices are lengthened by using lower clock frequencies and reducing power consumption more, and at the same time, a high-speed processing is required so as to process moving images. It becomes possible to reduce the clock frequencies of the system if the bus switch circuit 101 can perform a proper path establishment for an interrupt process.

First Embodiment

FIG. 1 is a block diagram showing a structure example of a bus switch system according to a first embodiment of the present invention. The present embodiment is basically the same as the one in FIG. 10, and different points of the two embodiments are described hereinafter. Interrupt signals 110 are inputted to master side interface circuits A1, A2, and slave side interface circuits B1 to B3 in addition to a bus master M1.

When the interrupt signal 110 is inputted from externals, the bus master M1 priority processes an access to a bus slave in accordance with the interrupt signal 110. On this occasion, the master side interface circuits A1, A2, and the slave side interface circuits B1 to B3 operate so that the bus master M1 can access to the bus slave according to the interrupt signal 110 at a top priority. By these operations, it becomes possible for the bus master M1 to access to the bus slave at a high response speed.

For example, the case when the interrupt signal 110 is inputted to the bus master M1 while a bus master M2 is making access to a bus slave S1 is explained. The bus master M1 performs a predetermined process when the interrupt signal 110 is inputted. For example, it performs the access process to the bus slave S1. When the interrupt signal 110 is inputted, the interface circuit B1 gives priority to the process of the bus master M1 according to the interrupt signal 110, because the process of the interrupt signal 110 has a higher priority than that of the bus master M2. Meanwhile, when the interrupt signal 110 is not inputted, the interface circuit B1 gives priority to the process of the bus master M2 because the bus master M1 has a lower priority than the bus master M2. In this way, the interface circuit B1 can perform the process with a proper priority by inputting the interrupt signal 110.

Figure 2:
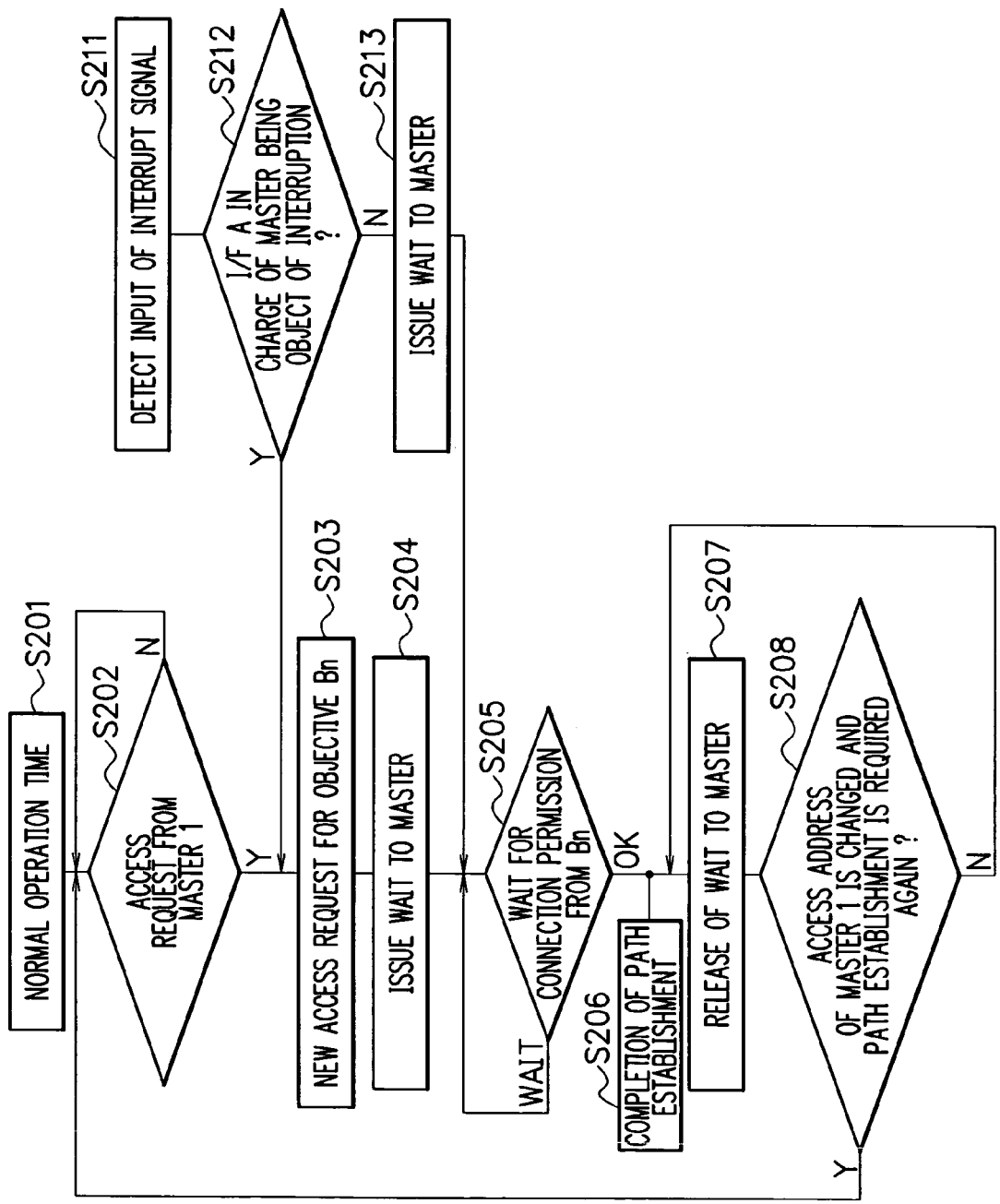
FIG. 2 is a flow chart showing a process example of a master side interface circuit.

FIG. 2 is a flow chart showing a process example of the master side interface circuit A1. The process of the master side interface circuit A2 is the same as this process.

At first, the steps S201 to S208 at a normal operation time are explained. At the step S201, the process at the normal operation time is performed. Next, at the step S202, the master side interface circuit A1 waits until an access request arises from the bus master M1. If the access request arises, at the step S203, a new access request is sent to a slave side interface circuit Bn being an object of the access. Here, the slave side interface circuit Bn is any of the interface circuits B1 to B3 specified by an address. Next, at the step S204, a wait signal is issued and sent to the bus master M1. Next, at the step S205, the master side interface circuit A1 waits for a connection permission from the slave side interface circuit Bn. If the connection permission is obtained, at the step S206, a path establishment between the master side interface circuit A1 and the slave side interface circuit Bn is completed. Next, at the step S207, a wait releasing signal is sent to the bus master M1. Next, at the step S208, an access address of the bus master M1 is changed, and it is checked if the path establishment is required again or not. If it is required, the process goes back to the step S202, and if it is not required, it goes back to the step S207.

Next, the steps S211 to S213 of interrupt processes are explained. At the step S211, when the input of the interrupt signal 110 is detected, the process goes to the step S212. Even in any status at the normal operation time, the process goes to the step S212 if the interrupt signal 110 is inputted. At the step S212, if it is the master side interface circuit (for example, the interface circuit A1) which is in charge of the bus master being an object of the interruption (for example, the bus master M1) or not is checked. When it is in charge of the bus master, the processes on and after the above-stated step S203 are performed, the access request to the interface circuit Bn is performed, and then, the process of the interrupt signal 110 is priority processed. When it is not in charge of the bus master, the process goes to the step S213. At the step S213, the wait signal is issued and sent to the self-corresponding bus master, and the process goes to the step S205.

As described above, the master side interface circuits A1, A2 send the wait signal to the bus master M2 which is other than the bus master M1 of the signal path established in accordance with the interrupt signal 110, and let the bus master M2 wait.

Figure 3:
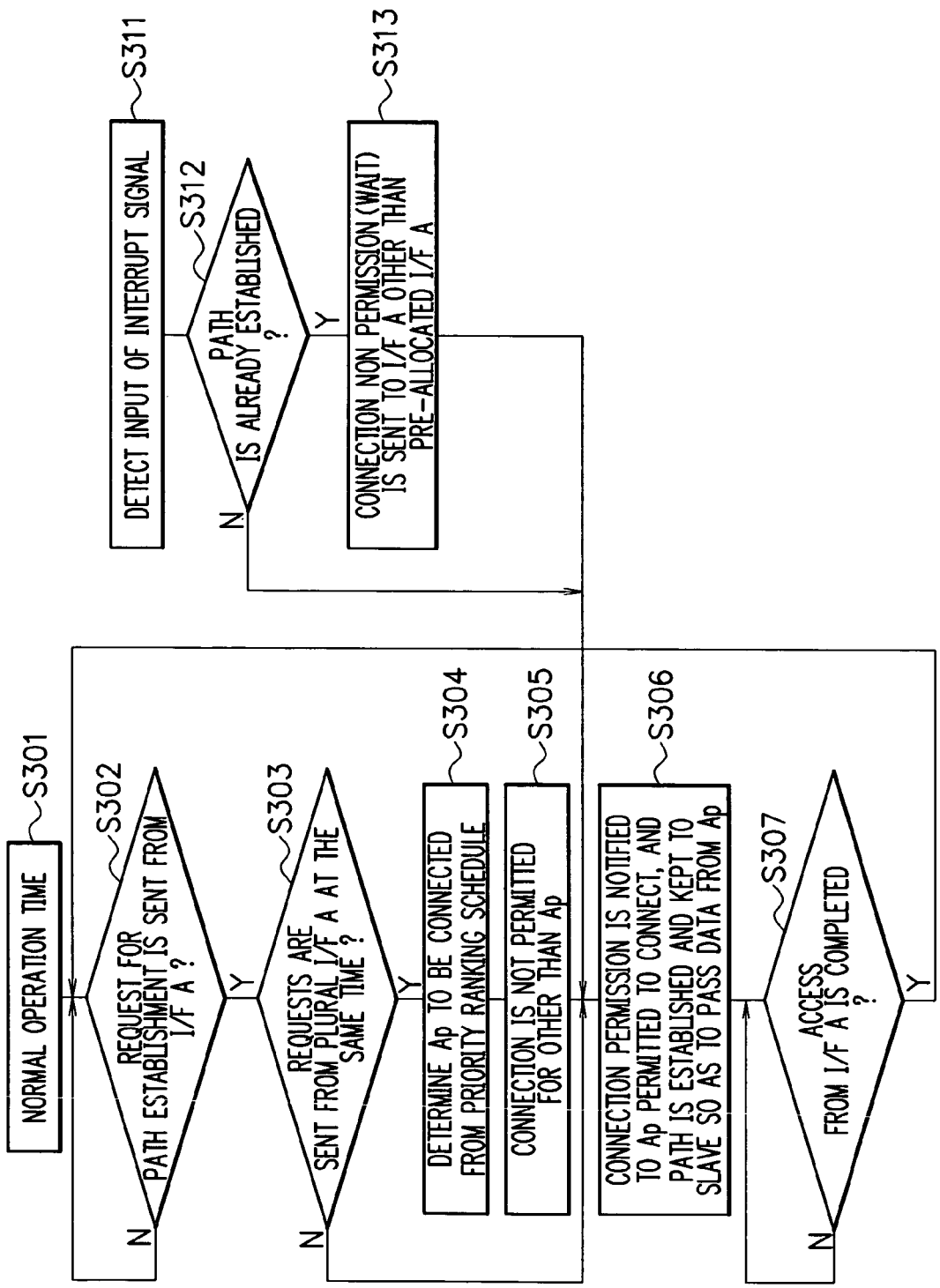
FIG. 3 is a flow chart showing a process example of a slave side interface circuit.

FIG. 3 is a flow chart showing a process example of the slave side interface circuit B1. The processes of the slave side interface circuits B2, B3 are the same as this process.

At first, the steps S301 to S307 at a normal operation time are explained. At the step S301, the process at the normal operation time is performed. Next, at the step S302, the slave side interface circuit B1 waits until a path establishment request is sent from the master side interface circuits A1, A2. If the requests are sent, at the step S303, it is checked if the requests are sent from the plural master side interface circuits A1, A2, at the same time, or not. If they are sent at the same time, the process goes to the step S304, and if they are not sent at the same time, the process goes to the step S306. At the step S304, a master side interface circuit Ap to be connected is determined from a priority ranking schedule. The master side interface circuit Ap is the master side interface circuit of the bus master M1 or M2 having a higher priority, and either of the master side interface circuit A1 or A2. Next, at the step S305, it is notified that the connection is not permitted to the master side interface circuit other than the master side interface circuit Ap. Next, at the step S306, the connection permission is notified to the master side interface circuit Ap, and a path is established and kept to either one of the corresponding bus slaves S1 to S3 so as to pass data from the master side interface circuit Ap. Next, at the step S307, the slave side interface circuit B1 waits until the accesses from the master side interface circuits A1, A2 are completed. After they are completed, the process goes back to the step S302.

Next, the steps S311 to S313 of interrupt processes are explained. At the step S311, when the input of an interrupt signal 110 is detected, the process goes to the step S312. Even in any status at the normal operation time, the process goes to the step S312, when the interrupt signal 110 is inputted. At the step S312, it is checked if a path is already established or not. If it is established, the process goes to the step S313, and if it is not established, the process goes to the step S306. At the step S313, a wait signal indicating the connection non-permission is sent to the master side interface circuit other than the pre-allocated master side interface circuit (for example, the interface circuit A1). For example, the wait signal is sent to the interface circuit A2 of the bus master M2 other than the bus master M1, so as to give a priority to the bus master M1 performing the process of the interrupt signal 110. After that, the processes on and after the above-stated step S306 are performed. Namely, when the interrupt signal 110 is inputted, the connection permission is sent to the master side interface circuit A1 in accordance with the interrupt signal 110, so as to forcibly establish a signal path in accordance with the interrupt signal 110. When the interrupt signal 110 is inputted, the signal path may be established in accordance with a priority ranking.

As described above, the bus switch circuit 101 according to the present embodiment has the plural master side interface circuits A1, A2 inputting/outputting the signals for the plural bus masters M1, M2 respectively, and the one or plural slave side interface circuit(s) B1 to B3 inputting/outputting the signals for the one or plural bus slave(s) S1 to S3. The master side interface circuits A1, A2, and the slave side interface circuits B1 to B3 input the interrupt signal 110 inputted at least to one bus master M1, and establish the signal path between the plural bus masters M1, M2, and the one or plural bus slave(s) S1 to S3 in accordance with the interrupt signal 110.

The bus master sends an address and an access request to the master side interface circuit to access the bus slave. The master side interface circuit receives the address and the access request from the bus master, and then, sends the address and the access request to the slave side interface circuit corresponding to the address. The slave side interface circuit receives the access request, and then, sends a connection permission signal to the master side interface circuit of the signal path established in accordance with the interrupt signal, and sends a connection non-permission signal to the other master side interface circuit. The master side interface circuit sends the wait signal to the corresponding bus master and let it wait while the connection non-permission is indicated from the slave side interface circuit. The slave side interface circuit outputs the address and an access control signal from the master side interface circuit of which the signal path is established to the bus slave. The bus slave is, for example, a memory, and outputs the data to the slave side interface circuit in accordance with the address and the access control signal. The data is transmitted to the bus master via the master side interface circuit of which the signal path is established.

Second Embodiment

Figure 4:
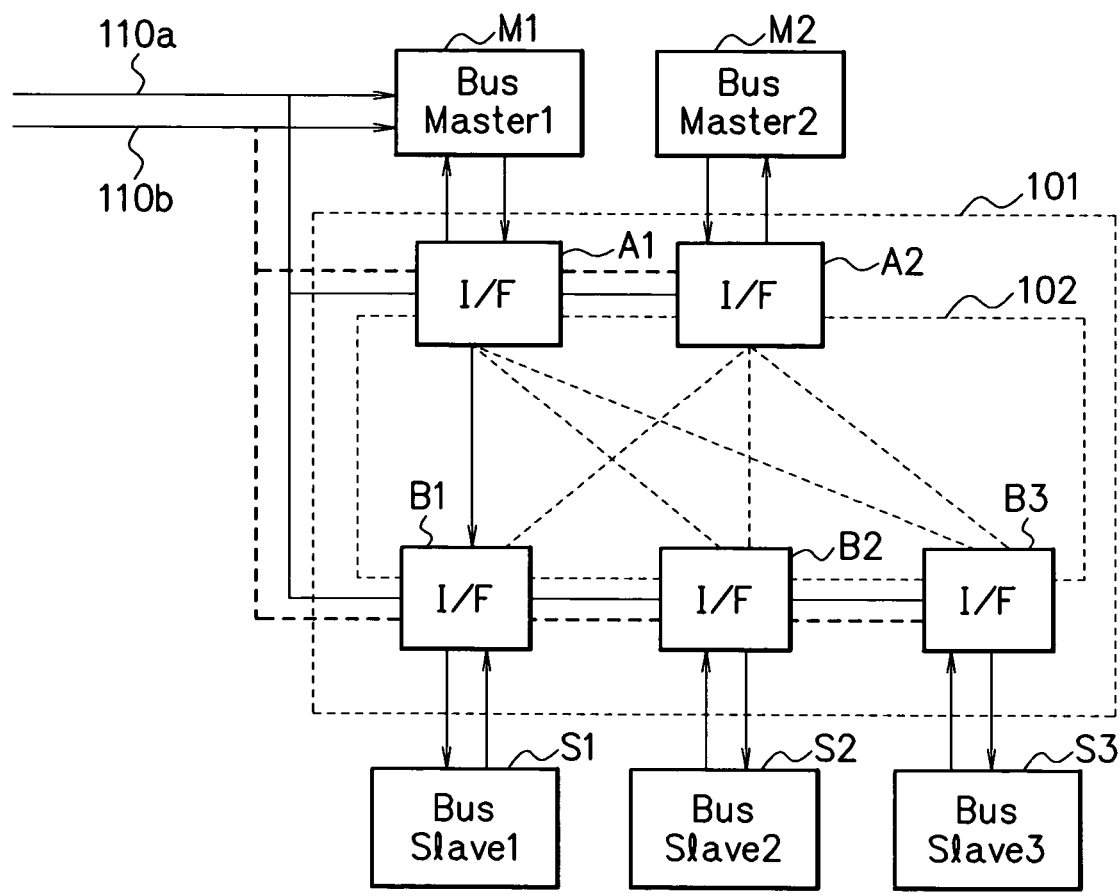
FIG. 4 is a block diagram showing a structure example of a bus switch system according to a second embodiment of the present invention.

FIG. 4 is a block diagram showing a structure example of a bus switch system according to a second embodiment of the present invention. The present embodiment is basically the same as the first embodiment (FIG. 1), and the different points of the two embodiments are described hereinafter. Two interrupt signals 110a and 110b are inputted to master side interface circuits A1, A2, and slave side interface circuits B1 to B3, in addition to a bus master M1. The interrupt signals 110a and 110b are set the respective priorities. The bus master M1 priority processes either of the interrupt signal 110a or 110b in accordance with their priority ranking, when the interrupt signals 110a and 110b are inputted at the same time.

Figure 5:
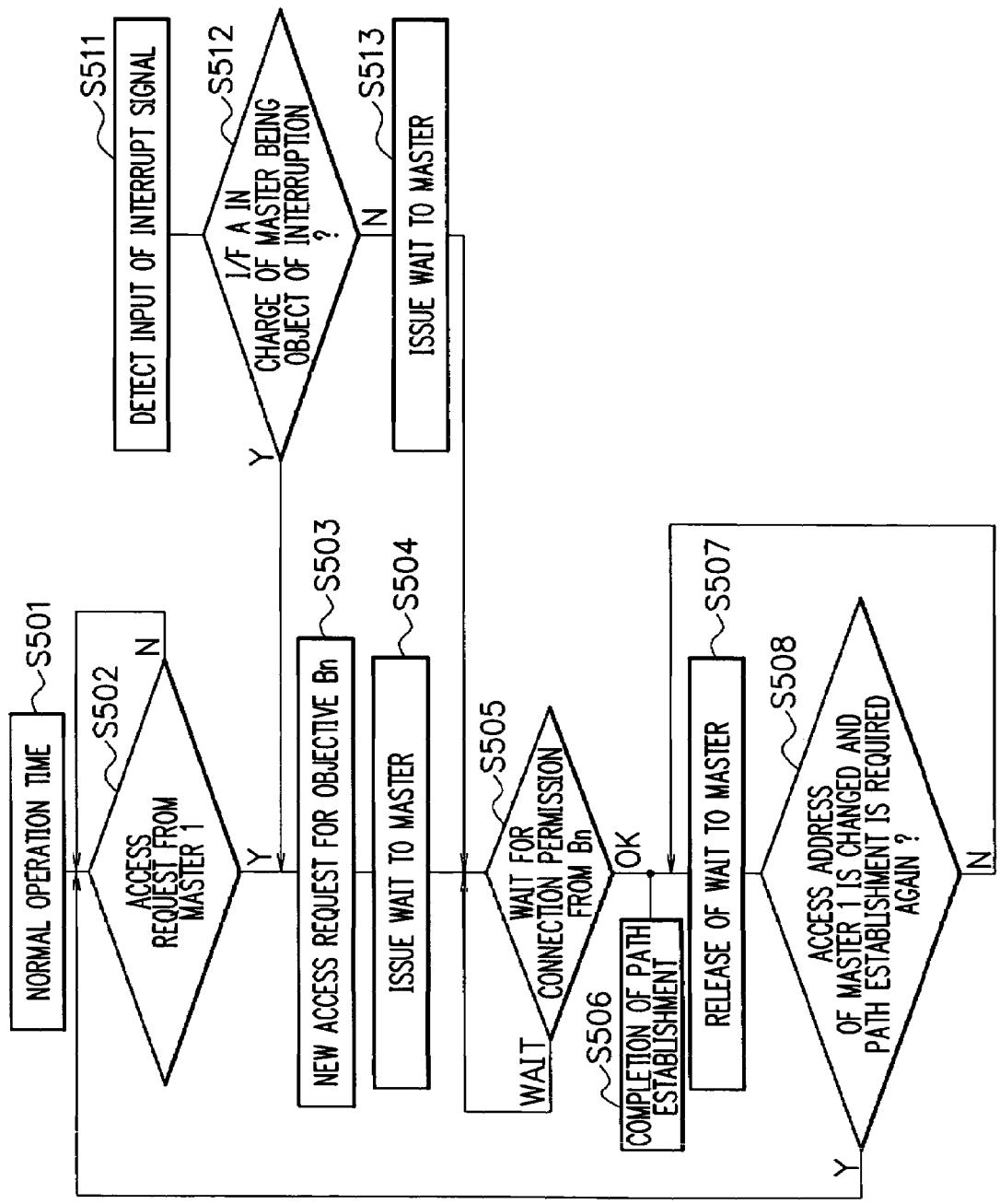
FIG. 5 is a flow chart showing a process example of a master side interface circuit.

FIG. 5 is a flow chart showing a process example of the master side interface circuit A1. The process of the master side interface circuit A2 is the same as this process. The steps S501 to S508 are processes at a normal operation time, and they are the same as the steps S201 to S208 shown in FIG. 2. The steps S511 to S513 are interruption processes, and they are the same as the steps S211 to S213 shown in FIG. 2.

Figure 6:
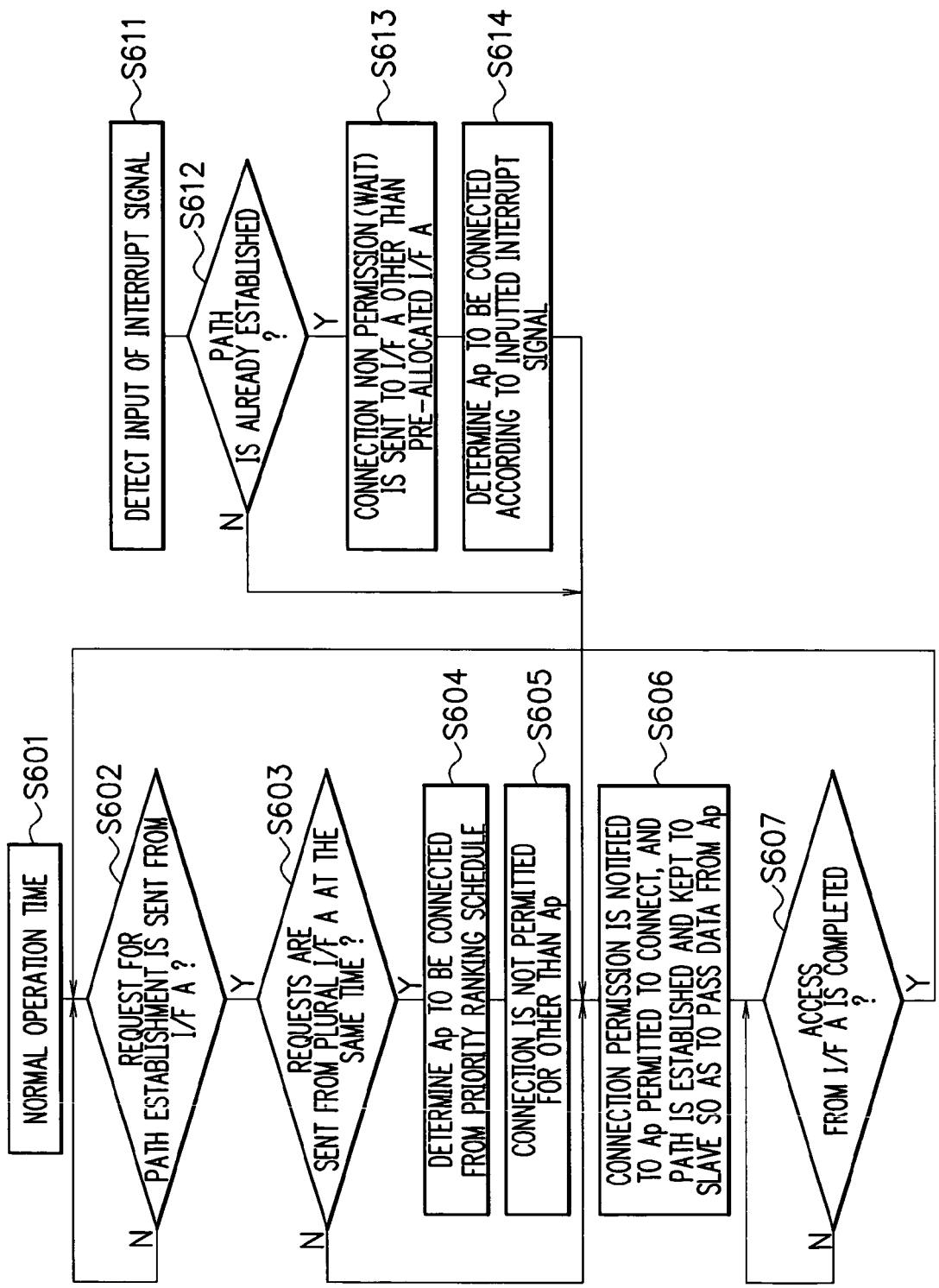
FIG. 6 is a flow chart showing a process example of a slave side interface circuit.

FIG. 6 is a flow chart showing a process example of the slave side interface circuit B1. The processes of the slave side interface circuits B2, B3 are the same as this process. The steps S601 to S607 are processes at a normal operation time, and they are the same as the steps S301 to S307 shown in FIG. 3.

The steps S611 to S614 of interrupt processes are explained. At the step S611, when the input of a interrupt signal 110 is detected, the process goes to the step S612. At the step S612, it is checked if a path is already established or not. If it is established, the process goes to the step S613, and if it is not established, the process goes to the step S606. At the step S613, a wait signal indicating the connection non-permission is sent to the master side interface circuit other than the pre-allocated master side interface circuit (for example, the interface circuit A1). Next, at the step S614, a master side interface circuit Ap to be connected is determined in accordance with the inputted interrupt signal 110a or 110b. After that, the processes on and after the step S606 are performed.

As described above, the interrupt signals 110a and 110b indicate the processes having the higher priorities than the bus masters M1 and M2. The bus master M1 suspends the current process if the interrupt signal 110a or 110b is inputted, and the process of the interrupt signal 110a or 110b is priority processed. Further, when the interrupt signals 110a and 110b are inputted at the same time, either one is priority processed in accordance with the predetermined priority ranking. The processes of the following are the same as those of the first embodiment, and the master side interface circuits A1, A2 and the slave side interface circuits B1 to B3 can priority process with a proper priority ranking in accordance with the input of the interrupt signal 110a or 110b.

The master side interface circuits A1, A2 and the slave side interface circuits B1 to B3 input the plural interrupt signals 110a, 110b inputted to one bus master M1, and establish the signal path between the plural bus masters M1, M2 and the one or plural bus slave(s) S1 to S3 in accordance with the plural interrupt signals 110a, 110b.

Third Embodiment

FIG. 7 is a block diagram showing a structure example of a bus switch system according to a third embodiment of the present invention. The present embodiment is basically the same as the second embodiment (FIG. 4), and the different points of the two embodiments are described hereinafter. Two interrupt signals 110c and 110d are inputted to master side interface circuits A1, A2, and slave side interface circuits B1 to B3, in addition to a bus master M2. The interrupt signals 110c and 110d are set the respective priorities. The bus master M2 priority processes either of the interrupt signal 110c or 110d in accordance with the priority ranking thereof, when the interrupt signals 110c and 110d are inputted at the same time. Further, the interrupt signals 110a, 110b, 110c, and 110d are set the respective priorities. The master side interface circuits A1, A2, and the slave side interface circuits B1 to B3 perform the processes of the interrupt signals 110a, 110b, 110c, and 110d in accordance with the priority ranking.

Figure 8:
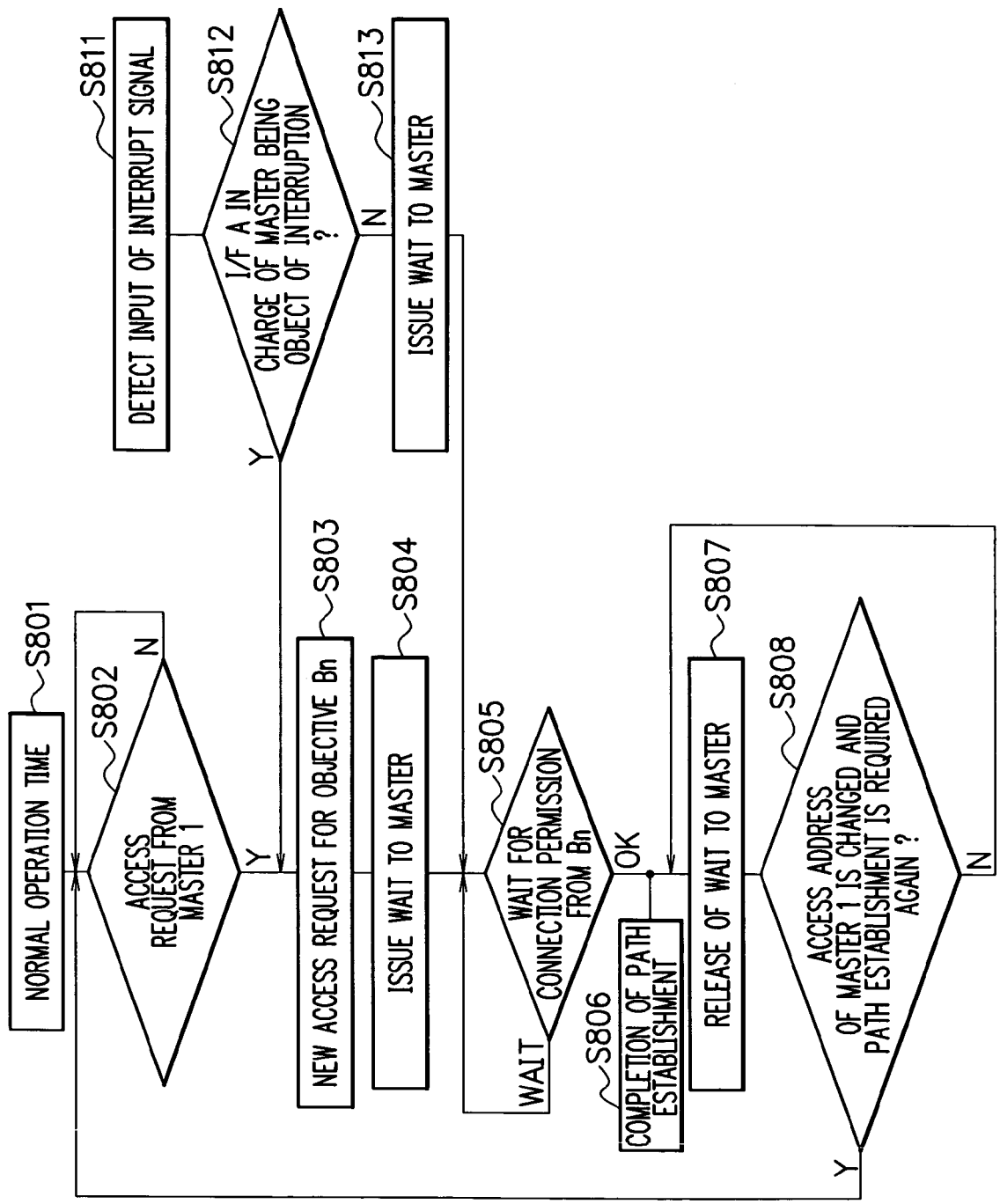
FIG. 8 is a flow chart showing a process example of a master side interface circuit.

FIG. 8 is a flow chart showing a process example of the master side interface circuit A1. The process of the master side interface circuit A2 is the same as this process. The steps S801 to S808 are the processes at a normal operation time, and they are the same as the steps S201 to S208 shown in FIG. 2. The steps S811 to S813 are interrupt processes, and they are the same as the steps S211 to S213 shown in FIG. 2.

For example, the case when the interrupt signal 110a is inputted is explained. An interface circuit Bn sends a wait signal to the interface circuit A2 and sends a connection permission signal to the interface circuit A1 when the interrupt signal 110a is inputted while it is accessed from the interface circuit A2. The interface circuit A1 obtains the connection permission at the step S805, and then the process goes to the step S806, and a path is established. The interface circuit A2 obtains the wait signal at the step S805, and then it waits at the step S805 until the connection permission is obtained.

Figure 9:
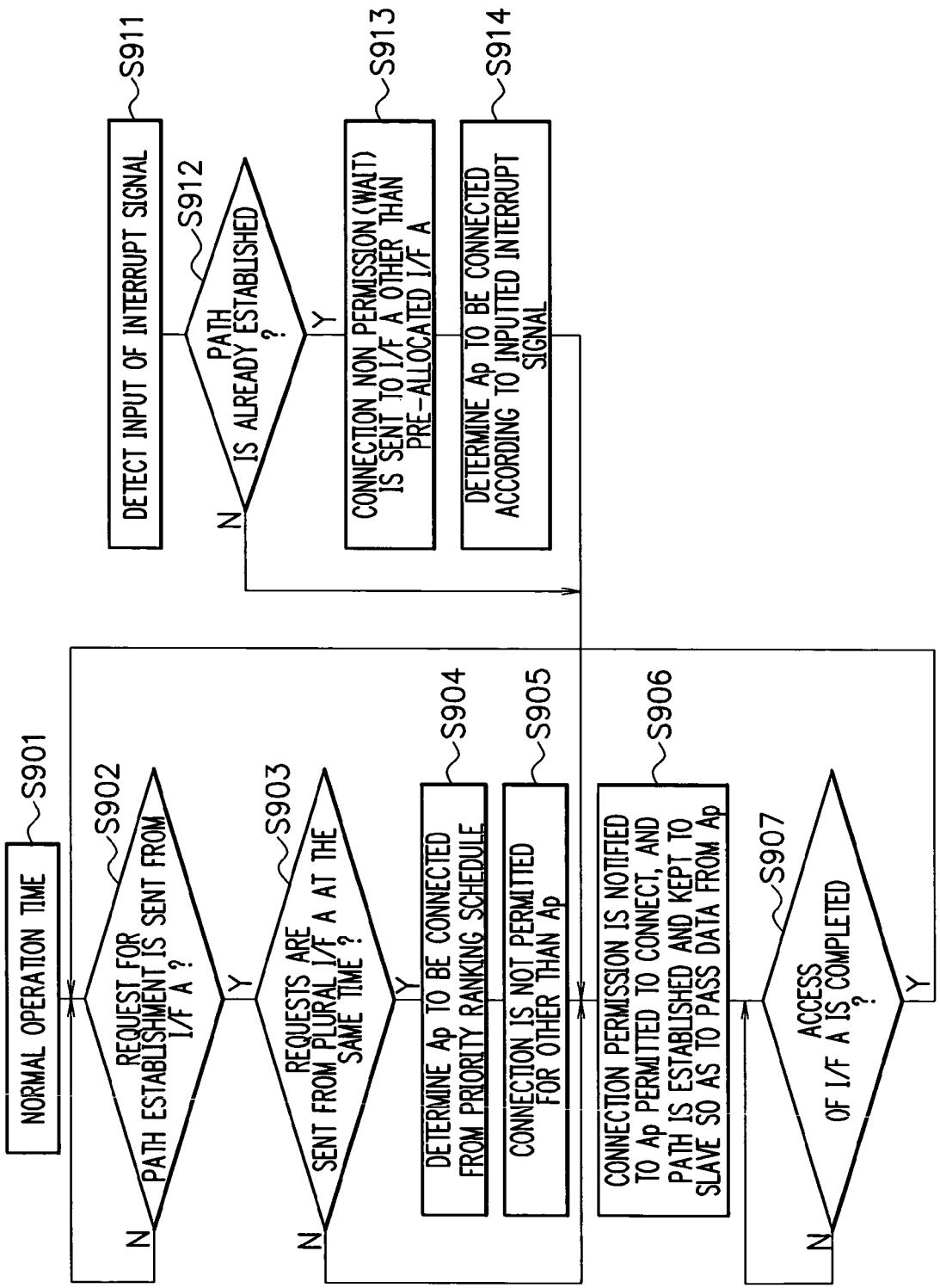
FIG. 9 is a flow chart showing a process example of a slave side interface circuit.

FIG. 9 is a flow chart showing a process example of the slave side interface circuit B1. The processes of the slave side interface circuits B2, B3 are the same as this process. The steps S901 to S907 are the processes at a normal operation time, and they are the same as the steps S601 to S607 shown in FIG. 6. The steps S911 to S914 are interrupt processes, and they are the same as the steps S611 to S614 shown in FIG. 6.

For example, the case when the interrupt signal 110a and the interrupt signal 110c having a lower priority than the interrupt signal 110a are inputted is explained. An interface circuit Bn sends the wait signal to the interface circuit A2 and sends a connection permission signal to the interface circuit A1 when the interrupt signal 110a is inputted while it is accessed from the bus master M2 according to the interrupt signal 110c. The interface circuit A1 obtains the connection permission and a path is established. The interface circuit A2 obtains a wait signal and waits until the connection permission is obtained.

The master side interface circuits A1, A2, and the slave side interface circuits B1 to B3 input the plural interrupt signals 110a, 110b, 110c, and 110d inputted to the plural bus masters M1, M2, and establish a signal path between the plural bus masters M1, M2 and the one or plural bus slave(s) S1 to S3, in accordance with the plural interrupt signals 110a, 110b, 110c, and 110d. When connection requests from the plural master side interface circuits competes with each other, the signal path according to the priority ranking of the interrupt signals is established.

As described above, according to the first to the third embodiments, the bus switch circuit 101 establishes a path between the bus master M1, M2 and the bus slaves S1 to S3 in accordance with the interrupt signals from externals, and thereby a real time response performance for the interrupt signal from externals can be drastically improved, the interrupt process at the time of occurrence of the interruption becomes speeding up, and a desired system performance requirement can be obtained with low clock frequencies. Namely, the interrupt process is priority processed, and therefore the interrupt process becomes fast. Herewith, the system can be operated with low clock frequencies, and by lowering the clock frequencies furthermore, the power consumption can be reduced. In particular, in the systems using a portable power source of a portable device such as a cellular phone PDA, or the like, there is a large effect in life extension of the operation time.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. A bus switch circuit, comprising:
plural master side interface circuits inputting/outputting signals for plural bus masters respectively; and
one or plural slave side interface circuit(s) inputting/outputting signals for one or plural bus slave(s) and functionally coupled to the plural master side interface circuits via a switch matrix,
wherein at least one external interrupt signal is inputted to at least one bus master, said plural master side interface circuits and said one or plural slave side interface circuits, the at least one interrupt signal comprising a priority that sets the at least one bus master that receives the at least one external interrupt signal to have a higher priority than the remaining plural bus masters that do not receive the external interrupt signal and establishing a signal path between said plural bus masters and said one or plural bus slave(s) in accordance with the priority through the switch matrix,
wherein upon receiving the at least one external interrupt signal, an existing signal path between a bus master of the plural masters that does not receive the external interrupt signal and said one or plural bus slave is suspended.

2. The bus switch circuit according to claim 1,
wherein said master side interface circuit and said slave side interface circuit input plural interrupt signals inputted to the one bus master, and establish the signal path between the plural bus masters and the one or plural bus slave(s) in accordance with the plural interrupt signals.

3. The bus switch circuit according to claim 1,
wherein said master side interface circuit and said slave side interface circuit input plural interrupt signals inputted to the plural bus masters, and establish the signal path between the plural bus masters and the one or plural bus slave(s) in accordance with the plural interrupt signals.

4. The bus switch circuit according to claim 1,
wherein said master side interface circuit and said slave side interface circuit forcibly establish the signal path in accordance with the interrupt signal when the interrupt signal is inputted.

5. The bus switch circuit according to claim 1,
wherein said master side interface circuit sends a wait signal to the bus master and let the bus master wait, other than the bus master of which the signal path is established in accordance with the interrupt signal.

6. The bus switch circuit according to claim 1,
wherein said master side interface circuit receives an address and an access request from the bus master, and then, sends the access request to said slave side interface circuit corresponding to the address.

7. The bus switch circuit according to claim 6,
wherein said slave side interface circuit receives the access request, and then, sends a connection permission signal to the master side interface circuit of the signal path established in accordance with the interrupt signal, and sends a connection non-permission signal to the other master side interface circuit.

8. The bus switch circuit according to claim 7,
wherein said master side interface circuit sends the wait signal to the corresponding bus master and let the bus master wait while the connection non-permission is indicated from said slave side interface circuit.

9. The bus switch circuit according to claim 1,
wherein said master side interface circuit and said slave side interface circuit establish the signal path in accordance with a priority ranking of the interrupt signal when the connection requests from said plural master side interface circuits are competing.

10. The bus switch circuit according to claim 1,
wherein the bus master priority processes the access to the bus slave in accordance with the interrupt signal when the interrupt signal is inputted.

11. The bus switch according to claim 1, wherein the at least one interrupt signal is one interrupt signal.

12. A bus switch system, comprising:
one or plural bus slave(s);
plural bus masters accessing to said one or plural bus slave(s);
plural master side interface circuits inputting/outputting signals for said plural bus masters respectively; and
one or plural slave side interface circuit(s) inputting/outputting signals for said one or plural bus slave(s) and functionally coupled to the plural master side interface circuits via a switch matrix, and
wherein at least one external interrupt signal is inputted to at least one of said plural bus masters, said plural master side interface circuits and said one or plural slave side interface circuits, the at least one interrupt signal comprising a priority that sets the at least one bus master that receives the at least one external interrupt signal to have a higher priority than the remaining plural bus masters that do not receive the external interrupt signal and establishing a signal path between said plural bus masters and said one or plural bus slave(s) in accordance with the priority through the switch matrix,
wherein upon receiving the at least one external interrupt signal, an existing signal path between a bus master of the plural masters that does not receive the external interrupt signal and said one or plural bus slave is suspended.

13. The bus switch system according to claim 12,
wherein said master side interface circuit and said slave side interface circuit input plural interrupt signals inputted to said one bus master, and establish the signal path between said plural bus masters and said one or plural bus slave(s) in accordance with the plural interrupt signals.

14. The bus switch system according to claim 12,
wherein said master side interface circuit and said slave side interface circuit input plural interrupt signals inputted to said plural bus masters, and establish the signal path between said plural bus masters and said one or plural bus slave(s) in accordance with the plural interrupt signals.

15. The bus switch system according to claim 12,
wherein said master side interface circuit and said slave side interface circuit forcibly establish the signal path in accordance with the interrupt signal when the interrupt signal is inputted.

16. The bus switch system according to claim 12,
wherein said master side interface circuit sends a wait signal to said bus master other than the bus master of which the signal path is established in accordance with the interrupt signal, and let the bus master wait.

17. The bus switch system according to claim 12,
wherein said master side interface circuit receives an address and an access request from said bus master, and then, sends the access request to said slave side interface circuit corresponding to the address.

18. The bus switch system according to claim 17,
wherein said slave side interface circuit receives the access request, and then, sends a connection permission signal to said master side interface circuit of which the signal path is established in accordance with the interrupt signal, and sends a connection non-permission signal to the other master side interface circuit.

19. The bus switch system according to claim 18,
wherein said master side interface circuit sends the wait signal to said corresponding bus master and let the bus master wait, while the connection non-permission is indicated from said slave side interface circuit.

20. The bus switch system according to claim 12,
wherein said master side interface circuit and said slave side interface circuit establish the signal path in accordance with a priority ranking of the interrupt signal, when the connection requests from said plural master side interface circuits are competing.

21. The bus switch system according to claim 12,
wherein said bus master priority processes the access to said bus slave in accordance with the interrupt signal, when the interrupt signal is inputted.

* * * * *